United States Patent
Barnes et al.

(10) Patent No.: US 7,806,207 B1
(45) Date of Patent: Oct. 5, 2010

(54) METHOD FOR POSITIONING TRANSPORTABLE AND RELOCATABLE HEAVY EQUIPMENT

(75) Inventors: R. Michael Barnes, Magnolia, TX (US); Robert R. Cuddie, Marble Falls, TX (US); Richard E. Robey, Houston, TX (US)

(73) Assignee: Loadmaster Engineering, Inc., Houston, TX (US)

( * ) Notice: Subject to any disclaimer, the term of this patent is extended or adjusted under 35 U.S.C. 154(b) by 18 days.

(21) Appl. No.: 12/329,354

(22) Filed: Dec. 5, 2008

(51) Int. Cl.
*B62D 51/06* (2006.01)
(52) U.S. Cl. ...................................... 180/8.1
(58) Field of Classification Search ................. 180/8.1, 180/8.5, 8.6
See application file for complete search history.

(56) References Cited

U.S. PATENT DOCUMENTS

| | | | | |
|---|---|---|---|---|
| 3,255,836 A | * | 6/1966 | Hoppmann et al. | 180/8.6 |
| 3,335,809 A | * | 8/1967 | Guinot | 180/8.1 |
| 3,576,225 A | * | 4/1971 | Chambers | 180/8.5 |
| 4,519,468 A | * | 5/1985 | Mick | 180/8.5 |
| 5,921,336 A | | 7/1999 | Reed | |
| 6,581,525 B2 | | 6/2003 | Smith | |
| 6,581,698 B1 | | 6/2003 | Dirks | |
| 7,182,163 B1 | | 2/2007 | Gipson | |
| 7,293,607 B2 | | 11/2007 | Lambert et al. | |

\* cited by examiner

*Primary Examiner*—Tony H. Winner
(74) *Attorney, Agent, or Firm*—Buskop Law Group, PC; Wendy Buskop

(57) ABSTRACT

A method for transporting and relocating heavy equipment using a fluid to lift heavy equipment with a lift assembly with a rotatable motion gear assembly. The method can include disengaging a rod one of four walking assemblies secured to the lift assembly and extending a push pull travelling system to move equipment in a first direction using roller treads. The method can include raising one of the four walking assemblies with the lift assembly and pivoting one walking assembly in an opposite direction. The method can include retracting the push pull travelling system and rotating the walking assembly to orient in a second direction.

12 Claims, 7 Drawing Sheets

METHOD FOR POSITIONING TRANSPORTABLE AND RELOCATABLE HEAVY EQUIPMENT

FIELD

The present embodiments relate to a method for transporting and relocating heavy equipment.

BACKGROUND

A need exists for a method for transporting a drilling rig that does not require a tractor or "sow" to move the rig 30 to 300 feet.

A further need exists for a method for moving a drilling rig that is capable of orientating the rig through 360 degrees in a fully pivoting and swiveling manner so that the rig can move through 360 degrees twice or three times, or the rig can move less than 360 degrees if needed.

The present embodiments meet these needs.

BRIEF DESCRIPTION OF THE DRAWINGS

The detailed description will be better understood in conjunction with the accompanying drawings as follows.

Figure 1:
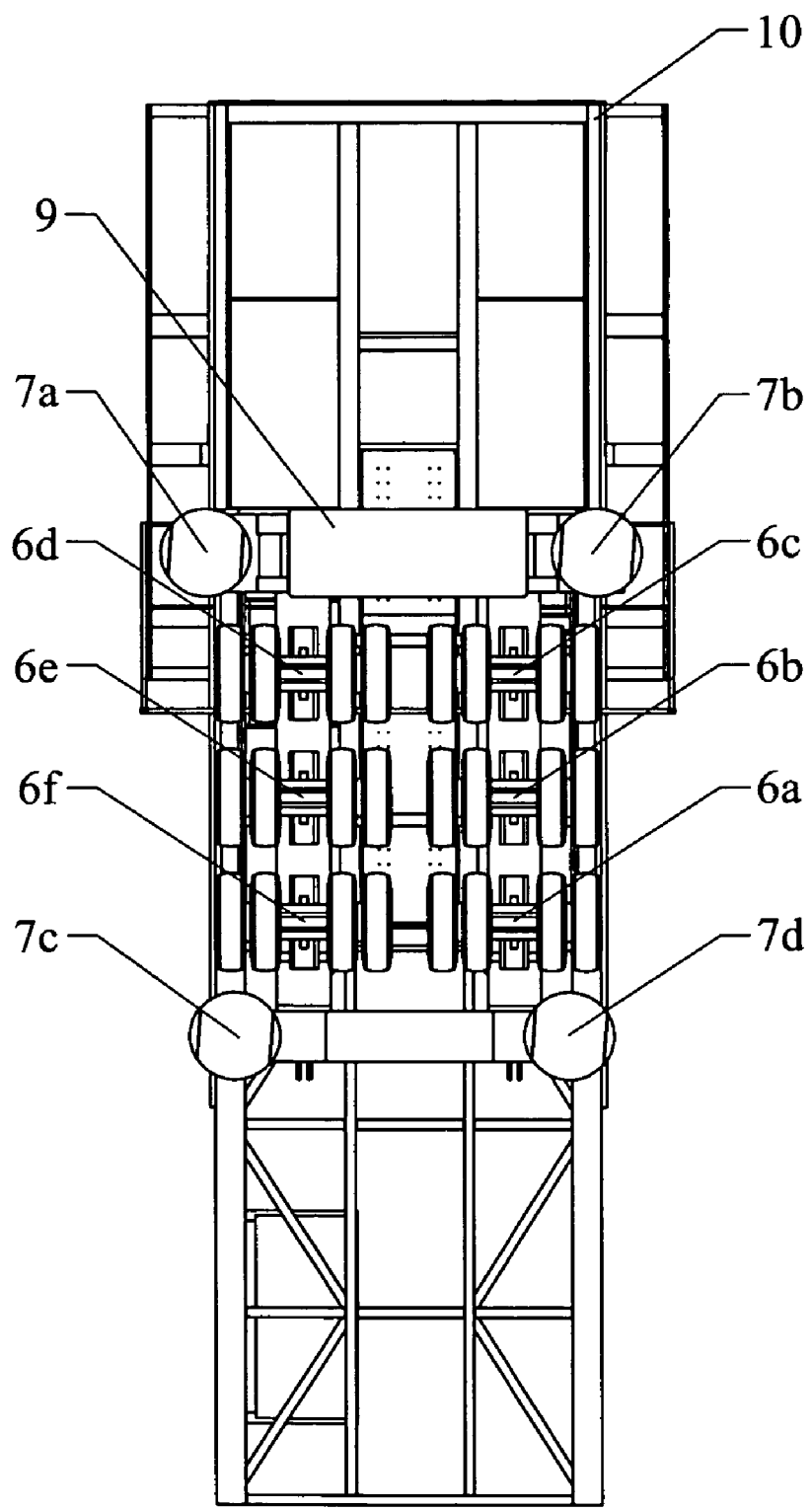
FIG. 1 depicts a bottom view of an embodiment of a system on which the method can be practiced.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments relate to a method for moving large heavy equipment such as a complete oil rig, parts of a big bridge, and a case of drilling tubulars. The method also relates to relocating the large heavy equipment to various places in a short period of time, typically ½ the time ordinarily needed to move rigs. For example, with the method, a rig can be moved 60 feet in only 6 hours, which is 1/10 of the time for ordinary disassembly, repositioning and reassembly.

An embodiment of the method enables a rig to be moved and enables tractors to be released from a transport base within about 1 hour of positioning, thereby dramatically reducing the cost of using both a transport tractor and trailer and enabling the tractor to be redeployed to another job practically immediately. The rental of tractors, known as "sows" can be expensive. If a tractor or "sow" is delayed for 24 hours, then the expense can be over $6000 per day. The invention saves these costs because sows are typically needed for at least 1 day and up to 3 days, which can cost up to $18,000.

The method enables repositioning of a drilling rig in its entirety from well to well without needing rails and without needing a separate "sow". The method saves tremendous costs for land based arctic drilling and large costs in the desert or even in West Texas.

An embodiment of this invention enables the rig to be moved without a tractor for small distances, ranging from about 60 feet and up to 1000 feet. The method enables very heavy equipment, weighing between about 10 English short tons to about 25 English short tons to be moved short distances without a sow, without a crane, and without any extra equipment. It is contemplated that movable, reusable mats can be put down under the walking pad assemblies to make sure the supported equipment does not fall off onto the ground while implementing the method.

An embodiment of this method enables the entire transport of the large equipment to be done automatically. By using a global positioning system (GPS), a wireless transmitter, and a connection to the internet, a user can move the entire rig from a remote location, far from the actual equipment, allowing automated moving in particularly harsh weather, such as very cold arctic weather.

In embodiments of the method the transport can be performed so that humans are in a safe building during implementation of the method, without fear of equipment falling on them.

The method can be used to move all kinds of structures, pipe trailers, equipment, prefabricated bridges, modular buildings and similar types of heavy construction applications. The method can be used to move structures during rainstorms, when people should not be out in the weather.

The embodiments can further relate to a method for positioning a transportable and relocatable drilling rig. The drilling rig can be a land based drilling rig for use on the arctic slopes or in the deserts of Afghanistan which have few repair facilities, limited resources, harsh climates and conditions causing sow engines to wear out.

The method can further be used in climates where diesel or gas driven engines for tractors or sows wear out easily.

The method can use a fluid, such as hydraulic oil, to lift heavy equipment using a lifting system attached to a frame. The lift assembly can also enable at least one rotatable motion gear assembly to lift heavy equipment off the ground and rotate it while it is lifted, and to transfer the weight onto at least 2 or more walking pad assemblies from tires of the frame supporting the heavy equipment.

Next, the fluid, which can be compressed air or hydraulic fluid, can be used to disengage at least one rod in one of four walking pad assemblies secured to the lift assembly.

Then, the fluid can be used to extend at least one of four different push pull travelling systems. By extending out, the push pull travelling system moves the heavy equipment in a first direction, rolling at least one roller tread against at least one roller load bearing surface of at least two of the walking pad assemblies.

Next, the fluid can be used to raise at least one of the four walking pad assemblies with the lift assembly. The raising of the walking pad assemblies can be a height between about 6 inches to about 24 inches. The walking pad assemblies can be raised from the ground and can then be reorientable using a pivoting collar.

Two of the four walking pad assemblies can be raised simultaneously, or three of the four walking pad assemblies can be raised at once.

The fluid can then be used to pivot the at least one walking pad assembly in an opposite direction that is a direction opposite the first direction, and then the fluid can be used to retract the at least one push pull travelling system.

The fluid can then be used to rotate the raised walking pad assembly about each rod of each walking pad assembly to orient the raised walking pad assembly in a second direction by using the rotatable motion gear assembly and the motor. The fluid can be controlled using a control means that allows fluid to flow in from a source and out through two or more ports for operating the various pieces of equipment.

The control means can have a processor with computer instructions to allow the control means to regulate flow of fluid to and from a fluid source through the control means or by the control means.

An on-board global position system ("GPS") can also be in communication with the processor for providing a location of the frame and walking pads of the walking pad assemblies. The processor can be in communication with not only a GPS satellite network, but other networks, such as the Internet, which can allow for wireless control of the transporting device using the method. Transmitting radio frequency identification tags ("RFID tags") can be placed on the frame for additional location of the device.

The method can include the step of using a positive locking means that locks the rod to prevent pivoting of the rod when it is desired to stop pivoting of the walking pad assembly.

In an embodiment, the method can include pivoting the walking pad assembly using a pivoting collar actuated by a working fluid controlled by the control means.

The method can be practiced on a system having at least four walking pad assemblies attached to a piece of transportable and relocatable equipment. The equipment can be on an additional trailer or supporting frame with at least two axels wherein each axel has at least two wheels. An embodiment can include 12 tires on 6 axels surrounded by the four walking pad assemblies.

Each walking pad assembly can have a walking pad for walking on a surface. Each walking pad assembly can have a rolling load bearing surface for engaging a roller tread allowing the roller tread to roll along the roller bearing surface.

The roller tread can be contained in a roller tread housing. The roller tread housing can have a central collar.

Each walking pad can be circular or square having a thickness of between about ¼ inches to about 1 inch.

Each walking pad can be made from steel or composite provided each walking pad can support between about 1 ton to about 8 tons of weight.

Each walking pad can be perforated in part, enabling the walking pads to walk through water without tipping, to walk on shifting sands without tipping, or to walk on snow without failing in transport. The diameter of the walking pad, if circular, can be between about 48 inches to about 96 inches.

The method can include using a lift assembly connected to the central collar. The lift assembly can have a rod for engaging the central collar, a flange slidably disposed around the rod and a lifting device, which can be removably connected to the flange.

The lift assembly can be made from steel, can have a length of between about 24 inches to about 48 inches, and can have a diameter between about 7 inches to about 9 inches.

The lift assembly can have a central annulus, which can have an inner diameter between about 6 inches to about 18 inches. A lift assembly can be purchased from Hyco Canada of Quebec, Canada.

The method can further include a rotatable motion gear assembly disposed around the lifting assembly.

The rotatable motion gear assembly can have the following characteristics: a high numerical ratio, low angular backlash and a compact profile. Such a gear assembly can be purchased from Kinematics Manufacturing. Inc. of Phoenix, Ariz.

A motor can be used to activate the rotatable motion gear assembly. The motor can be a DC motor using between about 24 volts to about 440 volts. In an additional embodiment, an AC motor, a pneumatic motor, or a hydraulic motor can be used. A hydraulic motor usable in the system can be one available from Bosch Rexroth AG.

A pivoting collar can be disposed around the rod. The pivoting collar can receive fluid, such as hydraulic or pneumatic fluid, from a control means. The control means can also dispense hydraulic or pneumatic fluid as working fluid.

The pivoting collar can have an inlet port for receiving the fluid. The inlet port can have a diameter between about 0.5 inches to about 1 inch. The pivoting collar can have an overall diameter of between about 8 inches to about 20 inches and can fit slidingly against the rod.

The control means can have a single inlet for fluid and a plurality of fluid outlets for controlling fluid flow to different parts of the walking pad assembly to lift and move the heavy equipment. The control means can further have a processor for receiving sensor signals from a sensor attached to each walking pad assembly and for using computer instructions in memory or associated data storage to compute the height and velocity of each walking pad assembly. The processor can also be connected to a global positioning system "GPS" to give exact coordinates of each walking pad. The processor can be connected to one or more networks, such as the Internet using two different protocols to provide information to multiple users with multiple devices simultaneously all over the world.

The method can include the use of a pivoting collar, which can have two parts, a collar stationary segment disposed around the rod and a collar rotating segment disposed around the collar stationary segment. The fluid can flow to the collar stationary segment and then to the collar rotating segment enabling hose-free rotating of the pivoting collar. The fluid can flow at a flow rate between about 0.01 gallons to about 6 gallons per minute. The fluid, if it is a liquid, can have a laminar flow. Fluids can include Tellus Oil available from Shell Industrial Lubricants of Houston, Tex.

The method can further include the use of a push pull traveling system that can receive the working fluid from the control means.

In an embodiment of the method, the push pull traveling system can have a push pull traveling system first side secured to one side of the roller tread housing and a push pull traveling system second side disposed on an opposite side of the roller tread housing. The push pull traveling system can be adapted to extend a specified distance causing movement of the equipment in a first direction.

The control means, in an embodiment, can receive fluid from a fluid source, can flow fluid out to the collar stationary segment, and can flow still more fluid to the lift assembly enabling the walking pad assemblies to actuate.

The fluid can enable the walking pad assemblies to raise, reorient, and lower the walking pads independent of each other or in pairs synchronously. The fluid can also enable the treads to actuate, rolling like a tank tread, enabling travel of the transportable and relocatable heavy equipment in a second direction.

In an embodiment, the rotatable motion gear assembly can be a rack and pinion or a rotary gear set. An example of the rack and pinion can be one available from Alpha Gear. Other usable rotary gear sets can be one available from Kinematics.

In another embodiment, the flange can be made from two flanges, including a square flange for removably engaging the transportable and relocatable equipment. The square flange can be removably attached to a round flange for providing a sealing engagement with the lifting device. These flanges can have inner diameters of between about 10 inches to about 20 inches and in the case of the round flange, can have an outer diameter of between about 10 inches to about 20 inches. The square flange can have sides that are between about 10 inches to about 36 inches in length.

In yet another embodiment, the central collar can be formed from a first collar half that can connect with a second collar half. These two collar halves can be made from a rigid, non-flexing material. The two collar halves can abut together, meeting to form the central collar.

The purpose of the central collar can be to locate and engage the roller tread housing about the lifting rod.

The rotatable motion gear assembly can be a hydraulic slewing drive such as those available from Kinematics Manufacturing of Phoenix, Ariz.

The method can use a rotatable motion gear assembly formed from a stationary ring surrounded by a rotating ring. The rotating ring can be actuated by a gear supported on a gear shaft driven by the motor.

The stationary ring can have an outer diameter of about 17 inches to about 19 inches and a height between about 3 inches to about 5 inches. The stationary ring can be made from iron or steel. The rotating ring can have an inner diameter of between about 12 inches to about 22 inches and an outer diameter between about 14 inches to about 24 inches. The rotating ring can slide around and can be disposed around the circumference of the stationary ring.

The push pull traveling system first side can be a first hydraulic cylinder and the push pull traveling system second side can be a second hydraulic cylinder. Each of the hydraulic cylinders can extend between the roller tread housing and the walking pad so that the roller tread housing can move a stroke distance causing the transportable and relocatable heavy equipment to travel a proportional distance. Usable hydraulic cylinders can have pistons that are about 24 inches to about 48 inches long. Examples of pistons usable in the embodiments can be those available from Hyco Canada.

At least one rod can be positioned at different vertical heights than the other rods for each walking pad of the plurality of walking pads.

Alternatively, the plurality of walking pads can have two pads with at least two rods that can be positioned for synchronous movement, which can be at the same speed.

In an embodiment, it is contemplated that all walking pads can be on a surface at one time, such as an arctic slope, to support the heavy equipment.

Sensors can be used to detect the movement and signal the processor of the control means. The sensors can be optical sensors, such as an optical sensor rotary encoder. In an embodiment, the GPS system can be in communication with the processor and can facilitate orientation of the walking pad assemblies, enabling it to be self steering.

The method can be used to transport and relocate a drilling rig in Alaska or in remote arctic Canadian fields full of snow. The pads can enable support on shifting snow safely.

The collar rotating segment can enable hose-less pivoting while rotating the hydraulic pivoting collar more than 360 degrees. The term "hose-less" can refer to a fluid connection that does not require a hose to span a distance between two fittings. In this case, the pivoting collar can provide the means for fluid flow between fittings while sealing against environmental conditions and maintaining system pressure.

A positive locating device can be used, which can be disposed around the rod. The positive locating device can be a stop, a magnet, a gear set, or combinations thereof. The stop can be about 1 inch high. The stop can be made from steel or iron. An iron alloy can be used as an electro magnet core on one of two opposing faces by applying a current to a set of windings around the iron, the two faces can mate positively. The gear set can also be a positive locating device by engaging two opposing gears into a mesh.

In an embodiment, the push pull traveling system can be a set of hydraulic pistons, such as those made by Hyco Canada, or a rack and pinion system such as those made by Alpha Gear. The push pull traveling system can also be a set of pneumatic pistons, such as those made by Parker Hannifin Corp., or a set of linear actuators, such as a model made by Parker Hannifin Corp.

In an embodiment of the method, the lift assembly, the lifting device and the pivoting collar can be hydraulic.

The first and second fluids can be hydraulic fluids such as an oil; a compressed air having a pressure between about 500 psi to about 5000 psi; another compressed gas such as inert nitrogen, helium, hydrogen, carbon dioxide having a pressure between about 250 psi to about 8000 psi; or a compressed vapor mixture such as a water/air mixture.

Turning now to FIG. 1, a bottom view is shown with a plurality of slightly rotatable axels 6a, 6b, 6c, 6d, 6e and 6f each supporting at least two tires. Four walking pads 7a, 7b, 7c and 7d are shown and can be supported by a frame 9 surround the tires and axes. The tires, axels and walking pads can support the frame 9, which can hold the transportable and relocatable equipment 10. The walking pads can be positioned on the outer periphery of the six axels with between 2 tires to 4 tires per axel.

Figure 2:
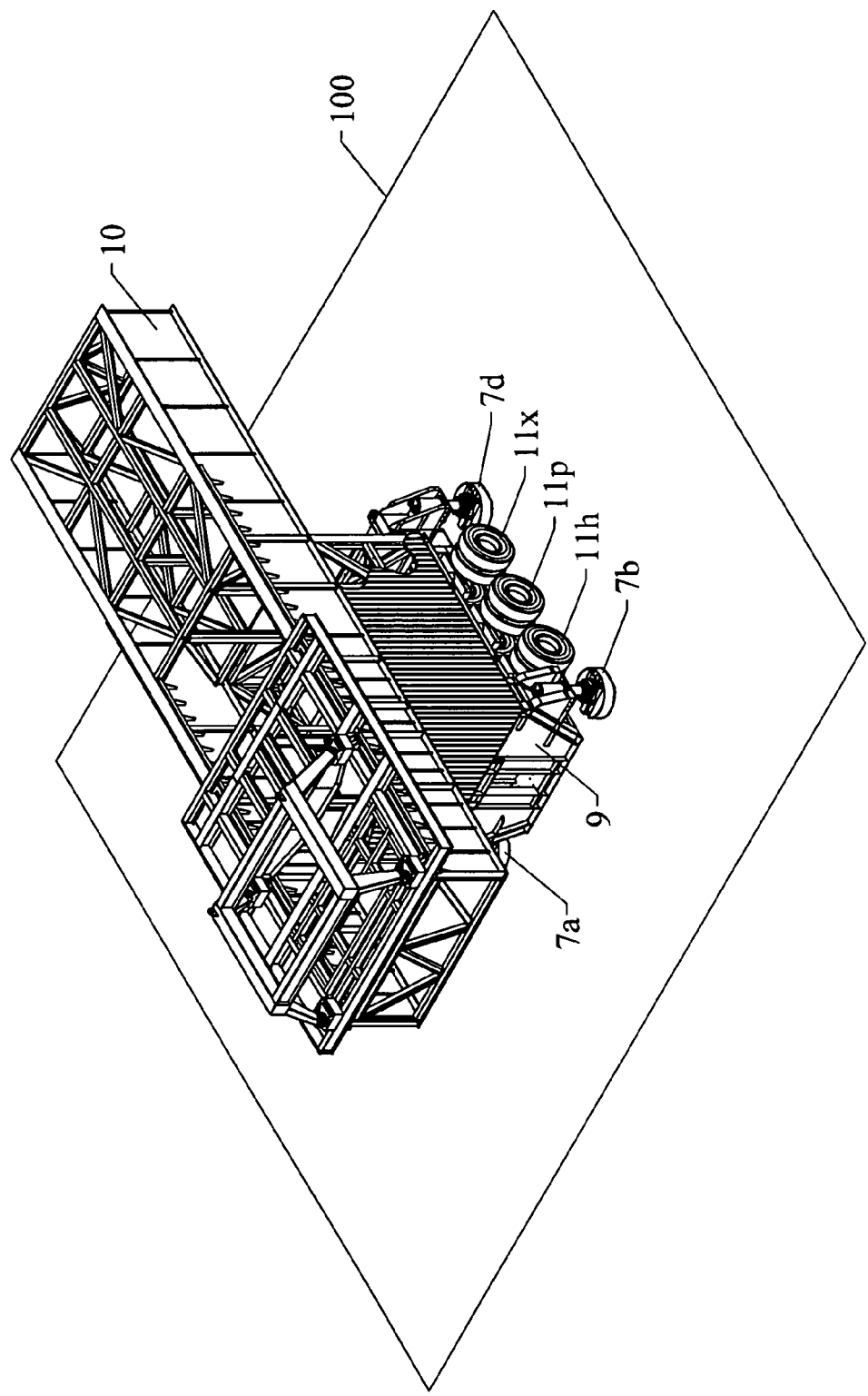
FIG. 2 depicts a perspective view of an embodiment of the system on which the method can be practiced.

FIG. 2 shows a side perspective view of three tires 11h, 11p and 11x positioned between the walking pads 7b and 7d. Also shown in FIG. 2 is walking pad 7a.

Walking pads 7b and 7d of respective walking pad assemblies can both engage a surface 100, such as the ground. Also shown is transportable and relocatable equipment 10, which in this embodiment, can be part of a drilling rig supported on frame 9.

The overall size of the frame 9 can be between about 8 feet wide to about 51 feet wide and between about 20 feet to about 67 feet long, which can make it easy to travel down a conventional street as a "wide load".

The frame 9 can have a connector for engaging with a "sow" or other similar tractor for pulling or pushing the frame. The frame can be off the ground on tires between about 20 inches to about 60 inches which can be adequate for normal ground clearances. The walking pads can lift the frame 9 at least about 12 inches to about 30 inches off the ground when fully extended.

Figure 3:
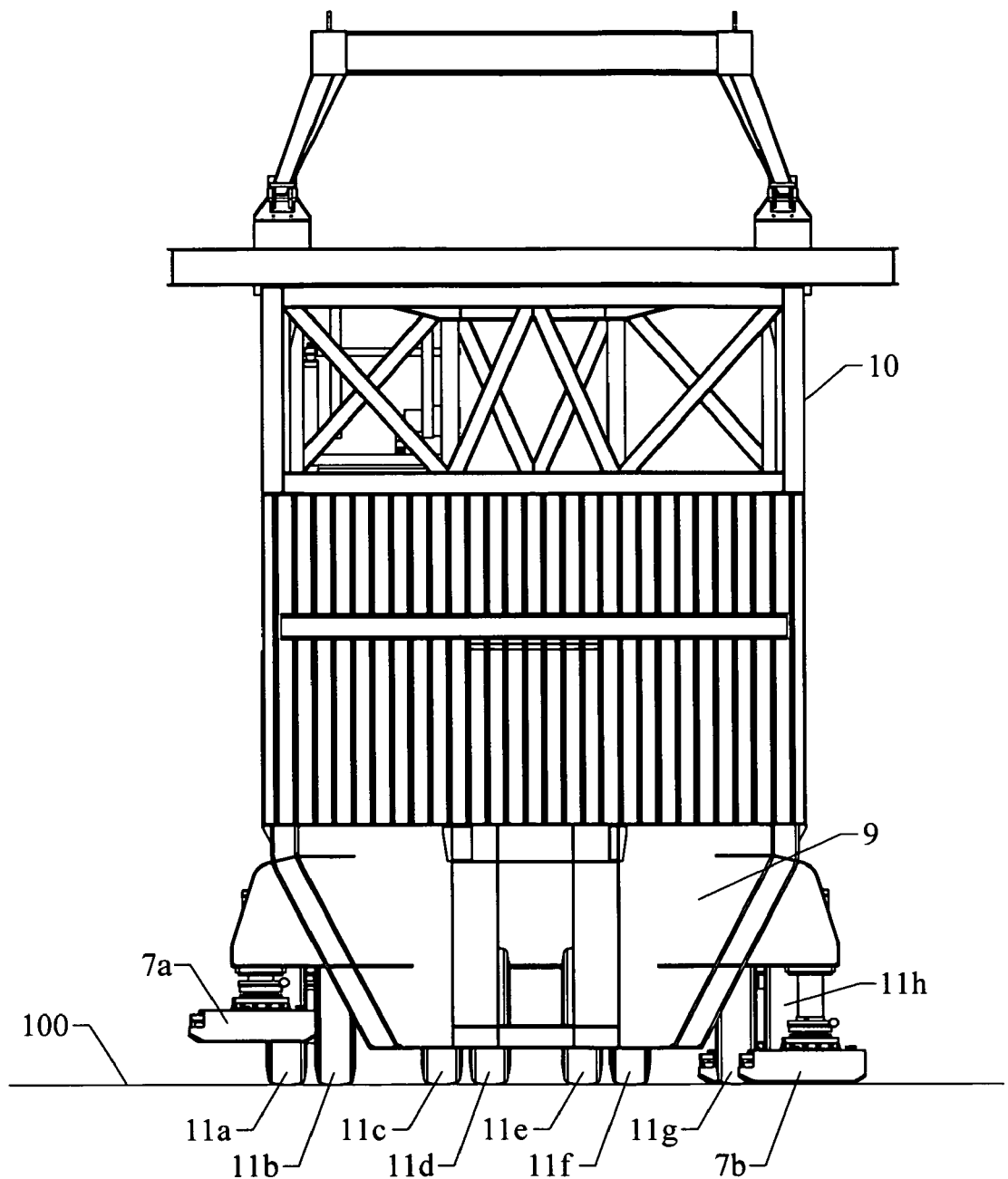
FIG. 3 depicts a front view of the system with a frame and a loaded drilling rig according to the invention.

FIG. 3 shows a front view of an embodiment wherein the walking pad 7a is shown off the surface 100 and the walking pad 7b is shown engaging the surface 100. Eight tires are shown in this view as elements 11a, 11b, 11c, 11d, 11e, 11f, 11g and 11h. The tires support the frame 9 which can hold part of a derrick of a drilling rig as transportable and relocatable equipment 10.

Figure 4:
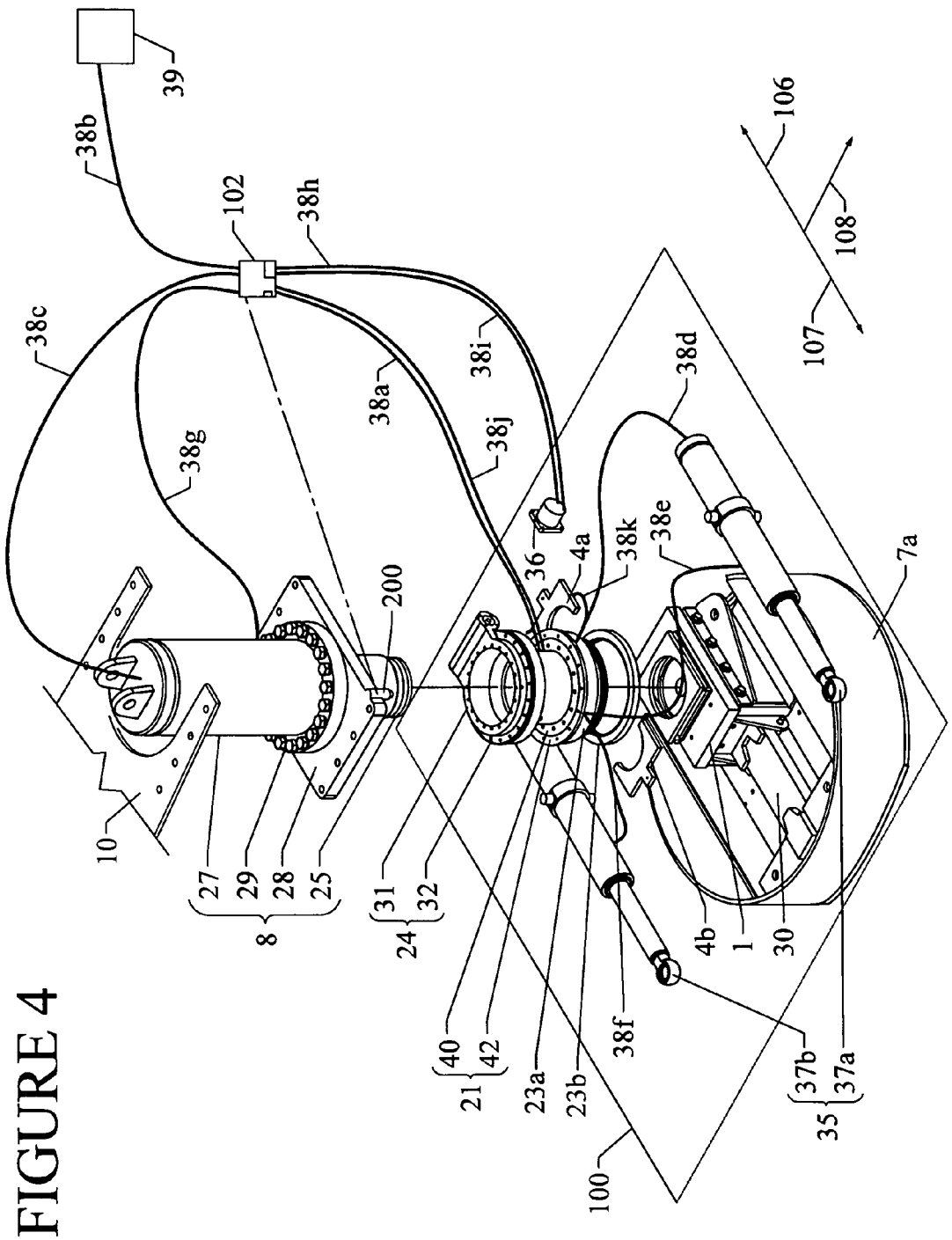
FIG. 4 depicts an exploded view of a walking pad assembly according to the invention.

FIG. 4 is an exploded view of a walking pad assembly which includes a walking pad 7a. In this embodiment, a roller tread housing 1 is shown. The roller tread housing can be made of steel and can be between about 4 inches tall by about 4 inches wide to about 12 inches tall by about 12 inches wide.

A roller bearing surface 30 can be disposed on the walking pad 7a. The roller bearing surface 30 can allow the roller tread to move against it and provide motion translating along its surface.

The walking pad 7a is shown with the push pull travelling system 35.

The central collar has a first collar half 4a that abuts a second collar half 4b that is centrally located about rod 25.

The rod 25 can be a part of the lift assembly 8, which can have a lifting device 27. In this Figure, a flange is shown as a two part assembly of a round flange 29 disposed on a square flange 28. The two flanges can be fastened together forming a single flange. A sensor 200 is shown attached to the square flange, which can be an optical sensor.

A rotatable motion gear assembly 24 can be disposed about the rod 25 and has a stationary ring 31. A rotating ring 32 can be disposed around the stationary ring 31.

Mounted to the rotatable motion gear assembly 24 can be a motor 36. Fluid can flow from a control means 102 to the motor 36 to operate the rotatable motion gear assembly 24.

In an embodiment the control means 102 can obtain fluid from a fluid source 39 as fluid 38b. The control means 102 can also flow fluid as fluid 38c to the lifting device 27.

The control means 102 can also flow fluid as fluid 38a to the pivoting collar 21. Fluid 38j is also shown.

Additionally, in an embodiment, fluid not only flows as fluid 38i to the motor 36, but can also flow as fluid 38h from the motor 36. The motor 36 can therefore flow fluid back to the control means 102.

Fluid can also flow from the control means 102 as fluid 38c to the lift assembly 8, and then back from the lift assembly 8 to the control means 102 as fluid 38g.

Fluid can flow to the central collar 4a and 4b from the control means 102 and from the central collar 4a and 4b as fluid 38d to the push pull traveling system first side 37a. Fluid can flow from the push pull traveling system first side as fluid 38e. Fluid can also flow to the push pull travel system second side 37b as fluid 38k. Fluid can flow back from the push pull travel system second side 37b depicted as fluid 38f.

The pivoting collar 21 can be made of a collar stationary segment 40 and a collar rotating segment 42.

Secured to the pivoting collar 21 can be a positive locating device which is depicted as having two components in this figure, namely first positive locating portion 23a and second positive locating portion 23b.

From the pivoting collar 21, fluid 38d can flow to the push pull travelling system 35.

The second positive locating portion 23b can be attached to the roller tread housing 1, as shown in this Figure.

The push pull travelling system 35 is shown with a push pull traveling system first side 37a and push pull travelling system second side 37b which are symmetrically opposed to each other. The push pull traveling system first side 37a and the push pull travelling system second side 37b are depicted as being hydraulic cylinders, which can be about 7 inches to about 10 inches in diameter, up to about 36 inches in length extended, and about 18 inches in length retracted. The piston can have about a 6 inch diameter in the cylinder.

The push pull travelling system 35 can create travel in a first direction 106 after lifting by the lifting device 27. After movement, the push pull travelling system can be retracted in the opposite direction 107 and then the system can be rotated by the rotatable motion gear assembly 24 to a second direction 108. The walking pad can be lowered to a surface, enabling the device to effectively "walk" on the walking pads. Then the device can be free to travel in the second direction on the rollers.

Figure 5:
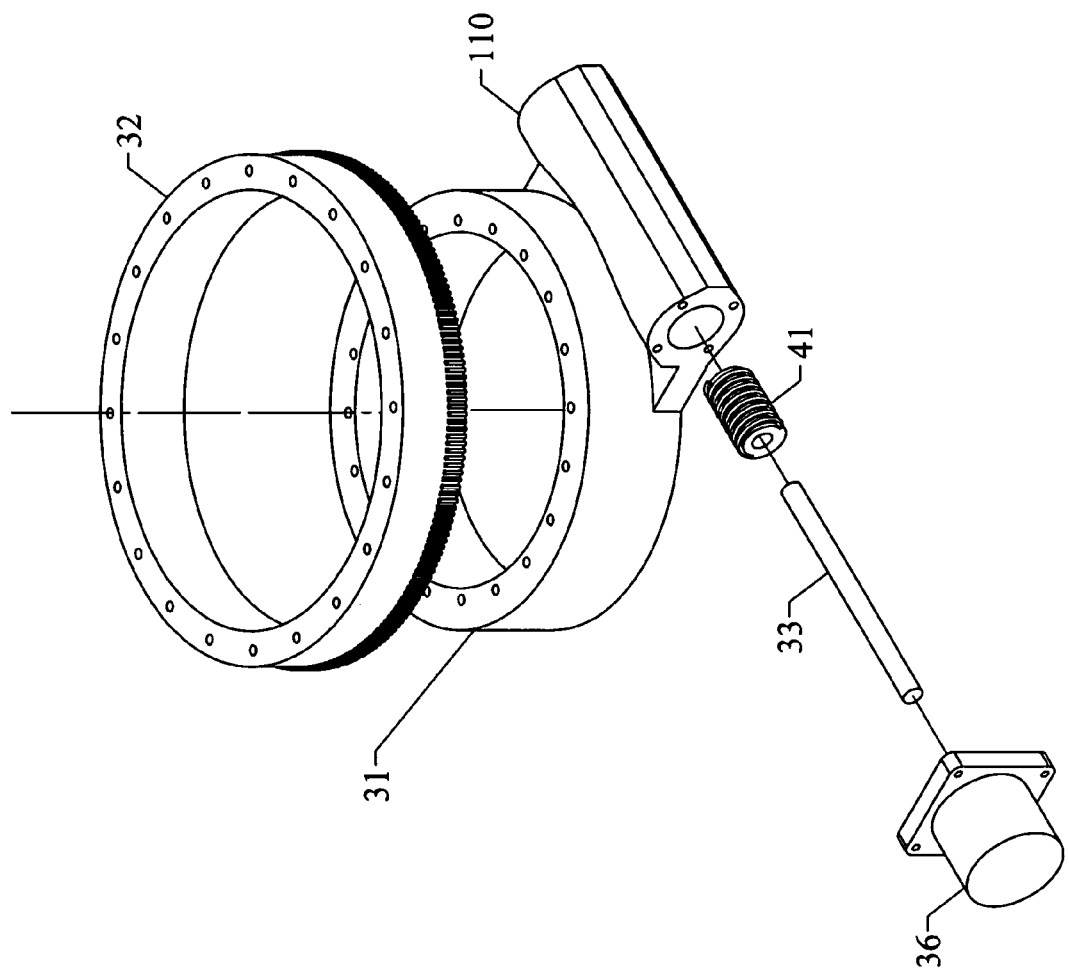
FIG. 5 depicts an exploded view of a rotatable motion gear assembly.

FIG. 5 depicts an exploded view of the stationary ring 31 inside the rotating ring 32. The stationary ring 31 can be secured to a worm housing 110. A gear 41 can engage a gear shaft 33 that can also be secured to the worm housing. A motor 36 can operate the gear shaft 33.

Figure 6:
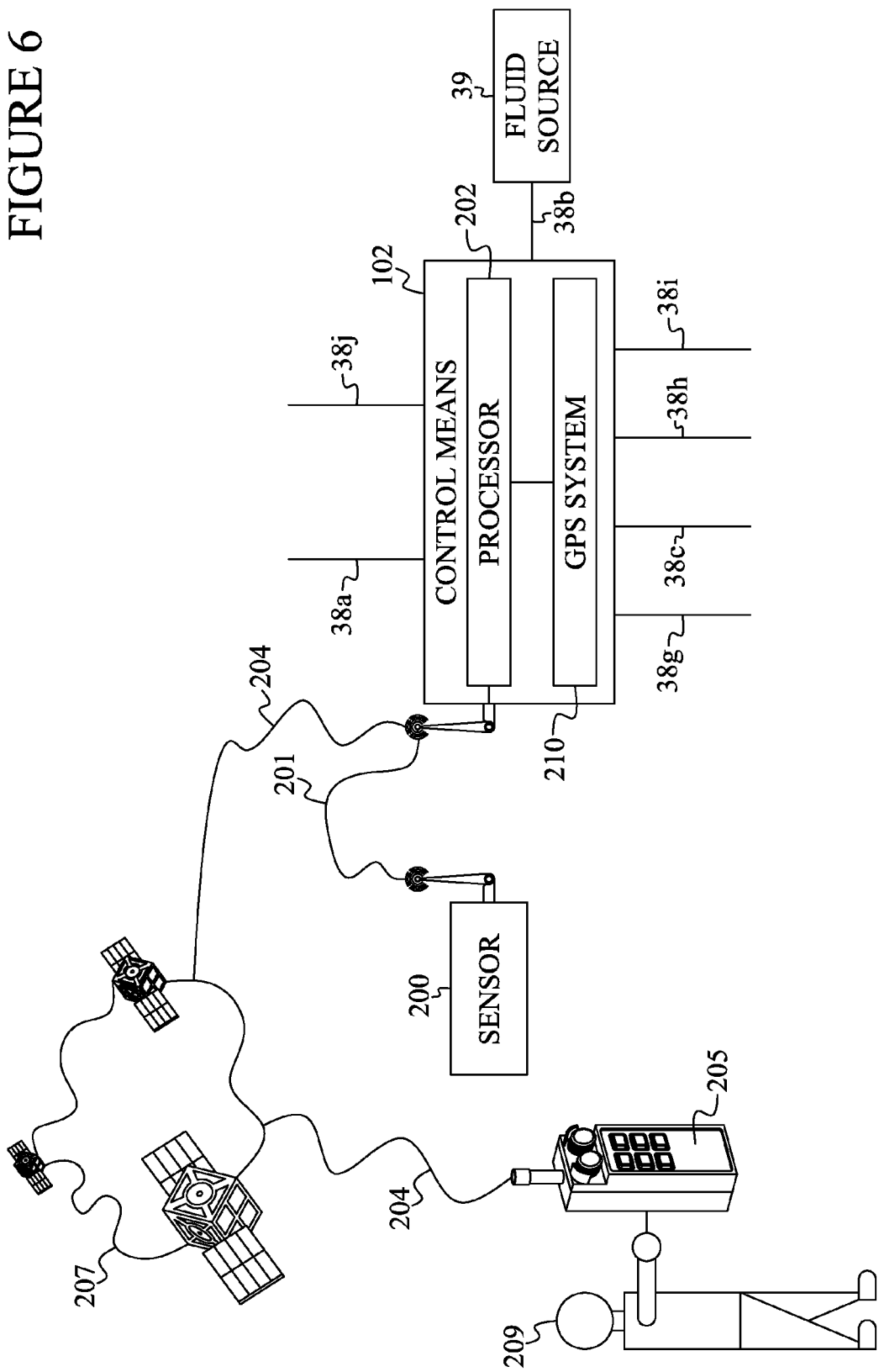
FIG. 6 depicts an embodiment of a control means usable in this method.

FIG. 6 shows a detail of the control means 102 with the processor 202 and a global positioning system 210.

The control means 102 has an inlet for receiving fluid 38b from a fluid source 39 and flowing it out as two fluids 38a and 38c to different components of the walking pad assembly. The fluid 38a flows from the control means to the stationary ring 40 of the pivoting collar 21 and the fluid 38c flows from the control means to the lift assembly 8.

The processor 202 can include memory or can be in communication with data storage having computer instructions for processing sensor signals 201 from sensor 200 attached to the flange. The sensor 200 can provide information on the orientation of each walking pad assembly, on the rate of movement, and the amount of vertical lift used by each walking pad assembly. The sensor 200 can be in wireless communication with the processor 202. The sensor 200 can be an optical sensor, such as an optical rotary encoder.

The control means 102 can transmit processed sensor signals 204 through a network 207 to a remote user 209 with a remote user device 205.

Figure 7:
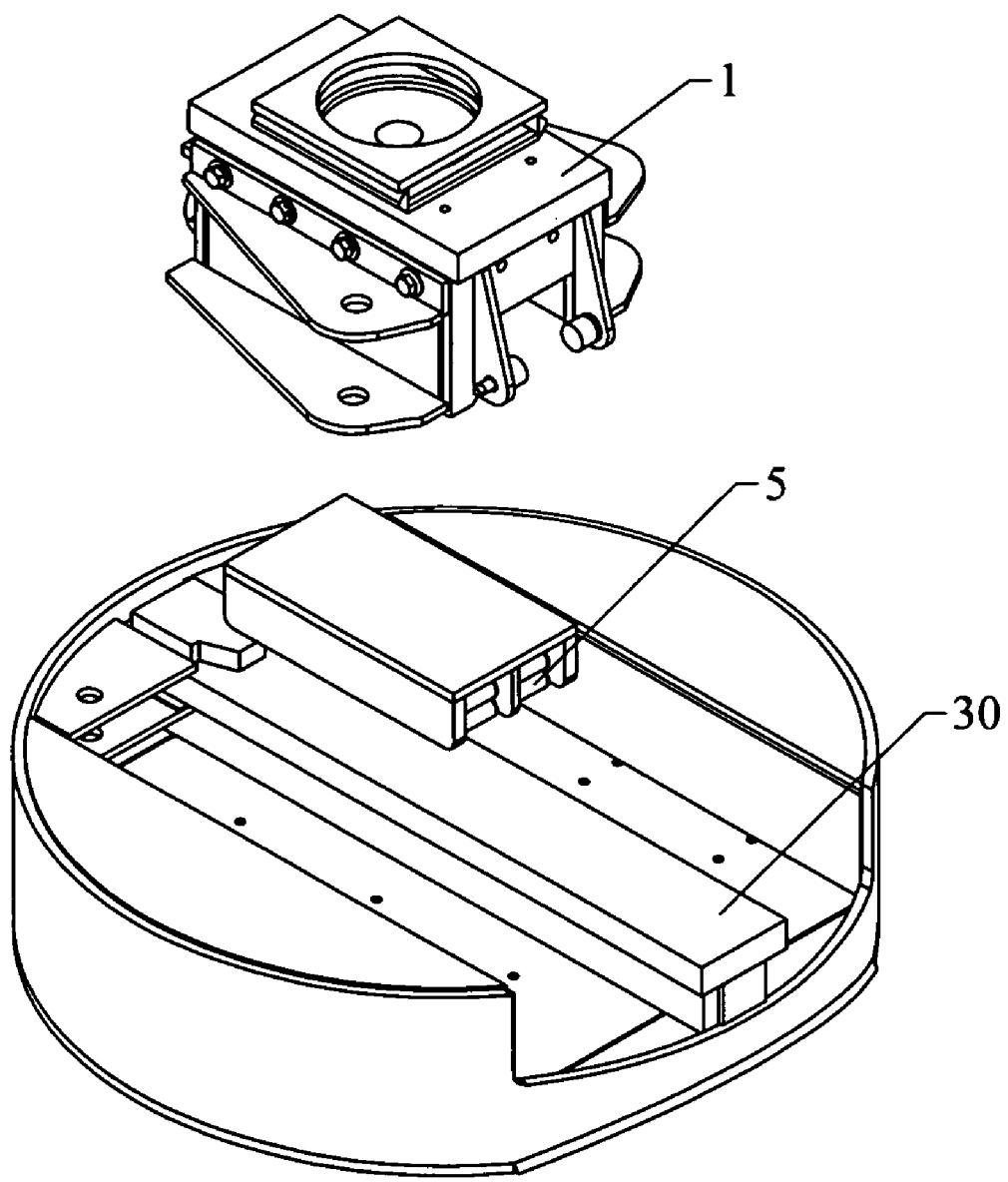
FIG. 7 depicts a roller tread housing and an associated tread usable in the method.

FIG. 7 shows a detail of the roller bearing surface 30 for engaging the roller tread 5 over which is disposed the roller tread housing 1.

The roller tread 5 can be about 1 inch to about 6 inch inches high by about 1 inch to about 12 inches wide.

While these embodiments have been described with emphasis on the embodiments, it should be understood that within the scope of the appended claims, the embodiments might be practiced other than as specifically described herein.

What is claimed is:

1. A method for transporting and relocating heavy equipment comprising the steps of:
   (i) using a fluid to lift heavy equipment with a lift assembly with at least one rotatable motion gear assembly;
   (ii) using the fluid to disengage at least one rod of at least one walking pad assembly of four walking pad assemblies secured to the lift assembly;
   (iii) using the fluid to extend at least one push pull travelling system of the at least one walking pad assembly to enable the heavy equipment to move in a first direction by rolling at least one roller tread against at least one roller load bearing surface of the at least one walking pad assembly;
   (iv) using the fluid to raise at least one of the four walking assemblies with the lift assembly;
   (v) using the fluid to pivot the at least one of the four walking pad assemblies in a second direction that is opposite the first direction;
   (vi) using the fluid to retract the at least one push pull traveling system; and
   (vii) using the fluid to rotate the at least one of the four walking pad assemblies about the at least one rod to orient the at least one walking pad assembly in a second direction using the rotatable motion gear assembly and a motor in fluid communication with the rotatable motion gear assembly, wherein the motor is in fluid communication with a control means, and wherein the fluid is controlled using the control means.

2. The method of claim 1, further comprising the step of locking the at least one rod to prevent pivoting of the at least one rod using a positive locating device.

3. The method of claim 1, wherein the pivoting of the at least one walking pad assembly is performed using a pivoting collar.

4. The method of claim 1, wherein the fluid used is a hydraulic fluid.

5. The method of claim 1, further comprising using sensors in communication with the control means to determine an orientation and a vertical height of each of the four walking pad assemblies, wherein a processor of the control means processes sensor signals provided by the sensors.

6. The method of claim 5, further comprising using a global positioning system in communication with the processor to locate a position of each of the four walking pad assemblies.

7. The method of claim 5, further comprising using a wireless network connection to receive the sensor signals by the processor, and then transmitting processed sensor signals to a remote user via a network.

8. The method of claim 1, wherein the motor is a DC motor or an AC motor.

9. The method of claim 1, further comprising moving the heavy equipment using remote control communication with a wireless transmitter and a wireless connection.

10. A method for transporting and relocating heavy equipment, the method comprising the steps of:
  (i) using a walking pad assembly comprising: four walking pads each having a roller load bearing surface, a roller tread disposed in a roller tread housing with a central collar, a push pull traveling system, a lift assembly connected to the central collar comprising a rod for engaging the central collar and a lifting device, wherein the walking pad assembly is used to perform the steps of:
    (i) lifting heavy equipment by flowing a fluid to the lifting device with a rotatable motion gear assembly disposed around the lift assembly;
    (ii) using the fluid to disengage the rod;
    (iii) moving the heavy equipment in a first direction by flowing the fluid to the push pull traveling system to extend the push pull travelling system thereby rolling the roller tread against the roller load bearing surface;
    (iv) flowing the fluid to the lifting device to raise at least one of the walking pads;
    (v) flowing the fluid to a pivoting collar disposed around the rod to actuate the pivoting collar to pivot the at least one walking pad in a direction opposite the first direction;
    (vi) flowing the fluid from the push pull traveling system to retract the push pull traveling system; and
    (vii) flowing the fluid to a motor in fluid communication with the rotatable motion gear assembly to activate the rotatable motion gear assembly to rotate the at least one walking pad about the rod to orient the at least one walking pad in a second direction, wherein the motor is in fluid communication with a control means, and wherein the fluid flow is controlled using the control means.

11. The method of claim 10, wherein the rotatable motion gear assembly comprises a stationary ring surrounded by a rotating ring, wherein the rotating ring is actuated by the motor.

12. The method of claim 10, wherein the lifting device, the pivoting collar, and the push pull traveling system are hydraulic.

\* \* \* \* \*